US012800491B2

(12) United States Patent
Yamanaka et al.

(10) Patent No.: US 12,800,491 B2
(45) Date of Patent: Nov. 17, 2026

(54) SPECTROSCOPIC MEASUREMENT METHOD AND SPECTROMETER TO PERFORM ACCURATE SPECTROSCOPIC MEASUREMENT

(71) Applicant: SEIKO EPSON CORPORATION, Tokyo (JP)

(72) Inventors: Shota Yamanaka, Matsumoto (JP); Tsugio Gomi, Fujimi-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/414,769

(22) Filed: Jan. 17, 2024

(65) Prior Publication Data

US 2024/0241051 A1 Jul. 18, 2024

(30) Foreign Application Priority Data

Jan. 18, 2023 (JP) ................................ 2023-006060

(51) Int. Cl.
*G01N 21/55* (2014.01)
*G01N 21/17* (2006.01)
(Continued)

(52) U.S. Cl.
CPC ........... *G01N 21/55* (2013.01); *G01N 21/314* (2013.01); *G01N 21/359* (2013.01); *G01N 2021/1765* (2013.01); *G01N 2021/3155* (2013.01)

(58) Field of Classification Search
CPC .... G01N 21/55; G01N 21/314; G01N 21/359; G01N 2021/1765; G01N 2021/3155; G01N 21/31; G01N 2201/0221
See application file for complete search history.

(56) References Cited

U.S. PATENT DOCUMENTS 12,143,731 B1 * 11/2024 Pawlik .................. H04N 23/88
2013/0258314 A1 * 10/2013 Gomi .................. G01J 3/2803 356/51
(Continued)

FOREIGN PATENT DOCUMENTS

CN 105872510 A * 8/2016 ............... H04N 9/73
EP 1161919 A2 * 12/2001 ........... A61B 5/0086
(Continued)

OTHER PUBLICATIONS

Leonardo Ayala, Light source calibration for multispectral imaging in surgery, International Journal of Computer Assisted Radiology and Surgery (2020), vol. 15, pp. 1117-1125. https://link.springer.com/article/article/10.1007/s11548-020-02195-y.
(Continued)

*Primary Examiner* — Michelle M Iacoletti
*Assistant Examiner* — Maher Yazback
(74) *Attorney, Agent, or Firm* — CHIP LAW GROUP

(57) ABSTRACT

A spectroscopic measurement method includes: a spectroscopic image acquisition step of acquiring, for a target object, visible spectroscopic images in a visible light region and near-infrared spectroscopic images in a near-infrared region; a provisional characteristic calculation step of setting a known spectroscopic spectrum of a light source body as a first reference, and calculating a spectral reflectance characteristic in a visible light region for each pixel as a provisional characteristic value by using the visible spectroscopic images and the first reference; a color conversion step of converting the provisional characteristic value into a color coordinate value; a reference setting step of identifying a specular reflection component pixel based on a saturation for each pixel, and setting a second reference based on the specular reflection component pixel; and a near-infrared characteristic calculation step of calculating a spectral
(Continued)

reflectance characteristic in a near-infrared region for each pixel by using the near-infrared spectroscopic images and the second reference.

7 Claims, 12 Drawing Sheets

(51) Int. Cl.
*G01N 21/31* (2006.01)
*G01N 21/359* (2014.01)

(56) References Cited

U.S. PATENT DOCUMENTS

| | | | | |
|---|---|---|---|---|
| 2014/0023267 | A1* | 1/2014 | Aizawa | G06V 30/153 382/164 |
| 2014/0192077 | A1* | 7/2014 | Gomi | G09G 5/02 345/589 |
| 2014/0240508 | A1* | 8/2014 | Gomi | G01J 3/0208 348/162 |
| 2016/0295189 | A1* | 10/2016 | Fujiwara | H04N 23/743 |
| 2019/0158796 | A1* | 5/2019 | Wang | H04N 23/88 |
| 2019/0268590 | A1* | 8/2019 | Kato | H04N 1/00244 |
| 2019/0301932 | A1* | 10/2019 | Sarkar | G01J 3/465 |
| 2020/0396434 | A1* | 12/2020 | Romanenko | H04N 9/73 |
| 2021/0310860 | A1 | 10/2021 | Takashima | |
| 2022/0373391 | A1* | 11/2022 | Gomi | G01J 3/26 |
| 2023/0248231 | A1* | 8/2023 | Fukazawa | A61B 1/0655 600/109 |
| 2024/0205551 | A1* | 6/2024 | Totsuka | H04N 23/10 |
| 2024/0354913 | A1* | 10/2024 | Ikeda | G06T 7/62 |

FOREIGN PATENT DOCUMENTS

| | | | | |
|---|---|---|---|---|
| EP | 1985981 | A2 * | 10/2008 | G01J 1/42 |
| JP | 2020024103 | A | 2/2020 | |

OTHER PUBLICATIONS

Office Action for JP Patent Application No. 2023006060, issued on Jul. 14, 2026, 8 pages.

* cited by examiner (1) RANDOMLY SELECT K SEED POINTS REPRESENTING REPRESENTATIVE POINTS OF CLASS (2) CLASSIFY INPUT PIXELS INTO CLASS OF NEAREST SEED POINTS (3) RE-CALCULATE AVERAGE POSITION (CENTER OF GRAVITY) OF CLASSES, AND MOVE SEED POINTS TO AVERAGE POSITION
(4) REPEAT PROCESSING UNTIL CLASS MOVEMENT DISAPPEARS

IMAGE AFTER ANALYSIS

SPECTROSCOPIC MEASUREMENT METHOD AND SPECTROMETER TO PERFORM ACCURATE SPECTROSCOPIC MEASUREMENT

The present application is based on, and claims priority from JP Application Serial Number 2023-006060, filed Jan. 18, 2023, the disclosure of which is hereby incorporated by reference herein in its entirety.

BACKGROUND

1. Technical Field

The present disclosure relates to a spectroscopic measurement method, a spectrometer, and a spectroscopic measurement program.

2. Related Art

In analyses and the like of a measurement target, a spectral reflectance of the measurement target in a near-infrared region may be measured. In the measurement of the spectral reflectance in such a near-infrared region, for example, near-infrared rays are emitted to the measurement target, and the reflected or transmitted near-infrared rays are measured by a spectroscopic camera to calculate the spectral reflectance in the near-infrared region (for example, see JP-A-2020-024103).

A spectrometer disclosed in JP-A-2020-024103 includes a spectroscopic camera (a multispectroscopic camera, a hyperspectroscopic camera, or the like), and an illuminance sensor. Illuminance of environmental light is measured by an illuminometer, and spectroscopic images captured by the spectroscopic camera are corrected by the measured illuminance. In JP-A-2020-024103, by measuring the illuminance by the illuminance sensor, it is possible to eliminate a need for imaging a reference object such as a white reference plate required in the related art.

However, in the technique in JP-A-2020-024103, it is necessary to separately mount the illuminance sensor on the spectroscopic camera or an apparatus where the spectroscopic camera is incorporated. Particularly, in recent years, there are many cases where the spectroscopic camera is mounted on a portable terminal device such as a smartphone or a tablet terminal, or a small flying object such as a drone. When a device such as the illuminance sensor is mounted on such a small and lightweight apparatus, a weight increases, and portability of the portable terminal device or mobility of the small flying object decreases. Further, since the portable terminal device and the small flying object are small, there is also a problem that it is difficult to secure a mounting space for the illuminance sensor. Therefore, a spectroscopic measurement method and a spectrometer which can perform highly accurate spectroscopic measurement without using a reference object, an illuminance sensor, and the like, and a spectroscopic measurement program for causing a computer to execute the spectroscopic measurement method are desired.

SUMMARY

A spectroscopic measurement method according to a first aspect of the present disclosure includes: a spectroscopic image acquisition step of acquiring, for a target object, visible spectroscopic images at a plurality of wavelengths in a visible light region and near-infrared spectroscopic images at a plurality of wavelengths in a near-infrared region; a provisional characteristic calculation step of setting a spectroscopic spectrum of a light source body whose spectroscopic spectrum is known as a first reference, and calculating a spectral reflectance characteristic in a visible light region for each pixel as a provisional characteristic by value using the visible spectroscopic images at the plurality of wavelengths in the visible light region and the first reference; a color conversion step of converting the provisional characteristic value into a color coordinate value including saturation; a reference setting step of identifying, based on the saturation for each pixel, a specular reflection component pixel that is a pixel where a light component specularly reflected by the target object is dominant, and setting a second reference based on the specular reflection component pixel; and a near-infrared characteristic calculation step of calculating a spectral reflectance characteristic in a near-infrared region for each pixel by using the near-infrared spectroscopic images at the plurality of wavelengths in the near-infrared region and the second reference.

A spectrometer according to a second aspect of the present disclosure includes: a spectroscopic image acquisition unit configured to acquire, for a target object, visible spectroscopic images at a plurality of wavelengths in a visible light region and near-infrared spectroscopic images at a plurality of wavelengths in a near-infrared region; a provisional characteristic calculation unit configured to set a spectroscopic spectrum of a light source body whose spectroscopic spectrum is known as a first reference, and calculate a spectral reflectance characteristic in a visible light region for each pixel as a provisional characteristic value by using the visible spectroscopic images at the plurality of wavelengths in the visible light region and the first reference; a color conversion unit configured to convert the provisional characteristic value into a color coordinate value including saturation; a reference setting unit configured to identify, based on the saturation for each pixel, a specular reflection component pixel that is a pixel where a light component specularly reflected by the target object is dominant, and set a second reference based on the specular reflection component pixel; and a near-infrared characteristic calculation unit configured to calculate a spectral reflectance characteristic in a near-infrared region for each pixel by using the near-infrared spectroscopic images at the plurality of wavelengths in the near-infrared region and the second reference.

A non-transitory computer-readable storage medium storing a spectroscopic measurement program according to a third aspect of the present disclosure includes: a spectroscopic image acquisition step of acquiring, for a target object, visible spectroscopic images at a plurality of wavelengths in a visible light region and near-infrared spectroscopic images at a plurality of wavelengths in a near-infrared region; a provisional characteristic calculation step of setting a spectroscopic spectrum of a light source body whose spectroscopic spectrum is known as a first reference, and calculating a spectral reflectance characteristic in a visible light region for each pixel as a provisional characteristic value by using the visible spectroscopic images at the plurality of wavelengths in the visible light region and the first reference; a color conversion step of converting the provisional characteristic value into a color coordinate value including saturation; a reference setting step of identifying, based on the saturation for each pixel, a specular reflection component pixel that is a pixel where a light component specularly reflected by the target object is dominant, and setting a second reference based on the specular reflection component pixel; and a near-infrared characteristic calculation step of calculating a spectral reflectance characteristic in a near-infrared region for each pixel by using the near-infrared spectroscopic images at the plurality of wavelengths in the near-infrared region and the second reference.

DESCRIPTION OF EMBODIMENTS

Hereinafter, a first embodiment will be described.

Figure 1:
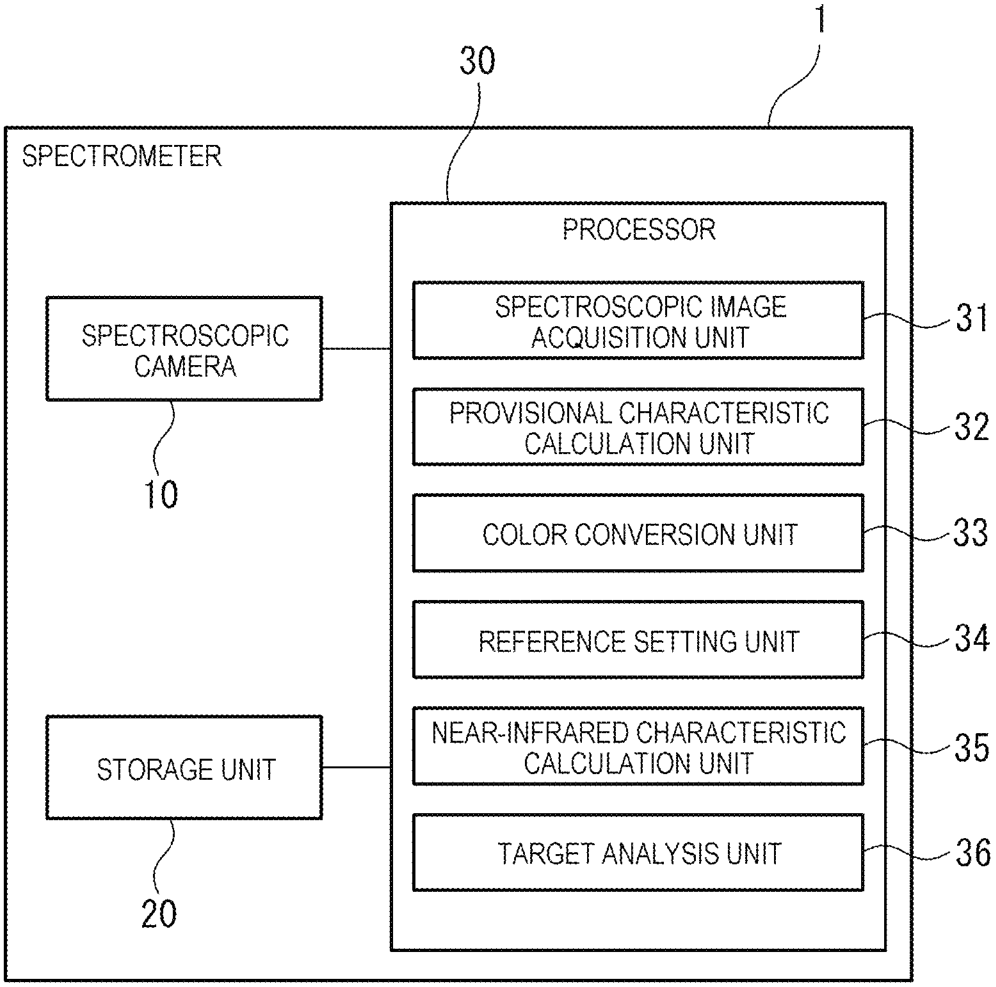
FIG. 1 is a block diagram showing a schematic configuration of a spectrometer according to an embodiment of the present disclosure.

FIG. 1 is a block diagram showing a schematic configuration of a spectrometer 1 according to the embodiment.

A spectrometer 1 according to the embodiment is, for example, a portable terminal device such as a smartphone, or a small flying object such as a drone, and includes a spectroscopic camera 10, a storage unit 20, a processor 30, and the like as shown in FIG. 1.

In the embodiment, the spectrometer 1 is a device in which a captured image of a target object imaged by the spectroscopic camera 10 is stored in the storage unit 20 and the processor 30 analyzes the captured image to perform various analyses of the target object.

Incidentally, when the captured image captured by the spectroscopic camera 10 is analyzed to perform various types of analysis processing, it is necessary to accurately calculate a spectroscopic spectrum of each pixel from the captured image. For this purpose, it is necessary to correct a luminance value (pixel value) for each pixel of the captured image at each spectral wavelength by using spectral data (reference) of a light source body (for example, sunlight) in an imaging environment. However, since it is necessary to reduce a weight of the portable terminal device and the small flying object as described above, it is not preferable to mount a calibration configuration such as a white reference body and an illuminance sensor for measuring a reference. In contrast, in the embodiment, such a calibration configuration is not necessary, and an analysis of a target object can be performed with high accuracy, thereof will be described below.

Figure 2:
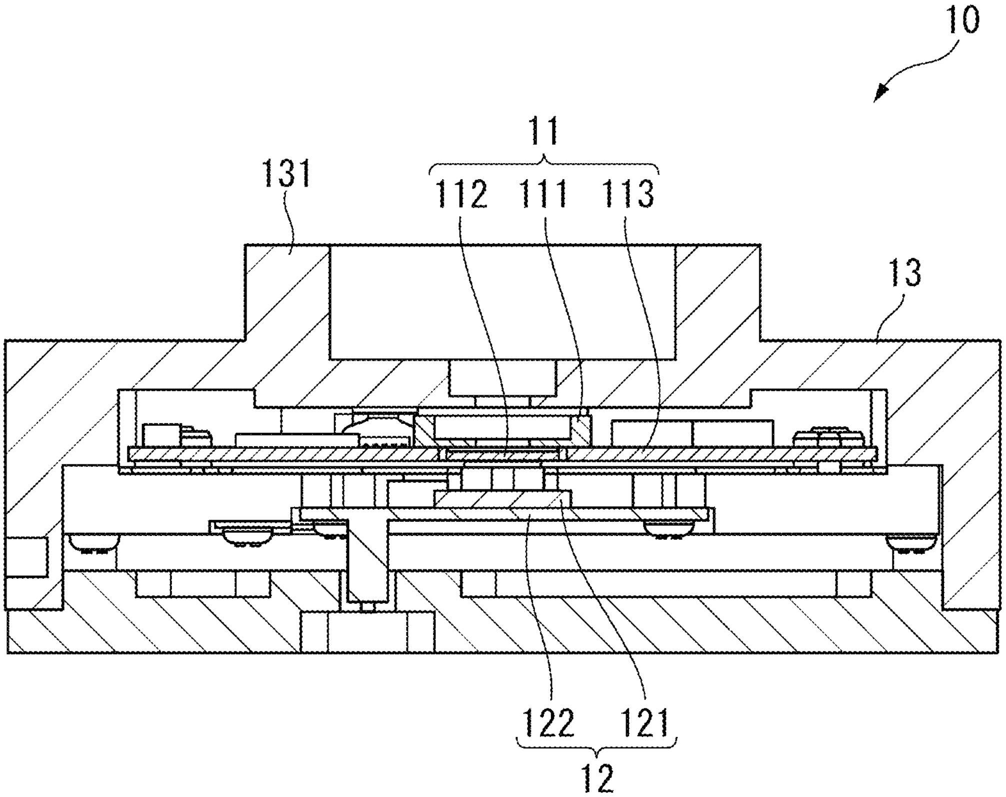
FIG. 2 is a diagram showing an example of a spectroscopic camera mounted on the spectrometer according to the embodiment.

FIG. 2 is a diagram showing an example of the spectroscopic camera 10 mounted on the spectrometer 1.

The spectroscopic camera 10 is implemented by a hyper-spectroscopic camera, a multispectroscopic camera, or the like. For example, as shown in FIG. 2, the spectroscopic camera 10 according to the embodiment includes a filter unit 11, an imaging unit 12, and a housing 13 that houses the filter unit 11 and the imaging unit 12.

The housing 13 is provided with a lens holder 131 from which a lens unit (not shown) can be attached or detached, incident light incident via the lens unit is guided to the imaging unit 12 via the filter unit 11, and imaging is performed by the imaging unit 12.

The filter unit 11 includes a band-pass filter 111 and a spectroscopic filter 112. In the example shown in FIG. 2, the band-pass filter 111 is provided on a lens holder 131 side, and the spectroscopic filter 112 is provided on an imaging unit 12 side, but the positional relationship thereof may be reversed.

The band-pass filter 111 is a filter that causes light having a predetermined wavelength region to be incident from the incident light, and for example, transmits light having a wavelength from a visible light region to a near-infrared region, and blocks light having other wavelengths in the embodiment. The band-pass filter 111 may include a visible light transmission filter that transmits light in a visible light region and blocks other light, and a near-infrared transmission filter that transmits light in a near-infrared region and blocks other light, and may have a configuration in which the visible light transmission filter and the near-infrared transmission filter can be switched. In this case, the band-pass filter 111 may further include a switching mechanism that switches the visible light transmission filter and the near-infrared transmission filter.

The spectroscopic filter 112 is a filter that can transmit light having a predetermined wavelength from the light transmitted through the band-pass filter 111 and that can switch a wavelength of light transmitted in a range from the visible light region to the near-infrared region.

As the spectroscopic filter 112, for example, preferably used is a wavelength-tunable etalon element (Fabry-Perot etalon) in which a pair of reflection films are disposed facing each other and light having a transmission wavelength is switched by changing a distance between the pair of reflection films. A small-sized spectroscopic filter 112 can be implemented by such a wavelength-tunable etalon element. As the spectroscopic filter 112, in addition to the etalon element described above, other filters such as an acousto-optic tunable filter (AOTF) or a liquid crystal tunable filter (LCTF) may be used.

The filter unit 11 includes a filter control unit 113 for controlling the spectroscopic filter 112.

For example, when a wavelength-tunable Fabry-Perot etalon element is used, an actuator that changes the distance between the pair of reflection films is provided. In this case, a control circuit that controls the actuator is provided in the filter control unit 113, whereby the distance between the pair of reflection films can be changed to a desirable value, and light having a desirable wavelength can be transmitted through the spectroscopic filter 112. A control amount (for example, a voltage value) of the actuator for the transmission wavelength of the spectroscopic filter 112 may be stored in the storage unit 20 as table data in advance. Accordingly, the processor 30 reads the table data in the storage unit 20 and outputs the table data to the filter control unit 113, whereby the spectroscopic filter 112 can be controlled. Here, an example is shown in which the table data is stored in the storage unit 20, but a configuration in which a memory circuit is provided in the filter control unit 113 and the table data is stored in the memory circuit may be adopted.

The imaging unit 12 includes an imaging element 121, and an imaging control board 122 that controls the imaging element 121.

The imaging element 121 can be, for example, an image sensor or the like such as a CCD or a CMOS, receives light having a predetermined wavelength (image light) transmitted through the filter unit 11, and outputs a light reception signal for each pixel to an imaging control circuit (not shown) provided at the imaging control board 122.

The imaging control board 122 includes the imaging control circuit, and controls the imaging element 121 to acquire image data of a spectroscopic image. That is, exposure control of the imaging element 121 is performed, light reception processing is performed at the imaging element 121, the image data, that is, a spectroscopic image obtained by converting the light reception signals into luminance values is generated based on the light reception signals output from pixels, and the generated spectroscopic image is output to the processor 30. The storage unit 20 records various programs and various pieces of data for controlling the spectrometer 1. The various programs recorded in the storage unit 20 include, for example, an imaging control program for controlling the spectroscopic camera 10, and a spectroscopic measurement program for measuring a spectral reflectance of the target object from the spectroscopic image.

Examples of the various pieces of data stored in the storage unit 20 include the table data for driving the spectroscopic filter 112 described above, and known spectral data of a light source body. The known spectral data of the light source body is a first reference according to the present disclosure, and examples thereof include a spectroscopic spectrum of sunlight. Further, in a case where a surrounding environment when performing spectroscopic measurement is fixed, a known spectroscopic spectrum of a light source body (for example, a spectroscopic spectrum of illumination light) in the environment may be recorded.

The processor 30 is implemented by, for example, an arithmetic circuit such as a central processing unit (CPU), and implements various functions by reading and executing the various programs stored in the storage unit 20.

In the embodiment, the processor 30 reads and executes the imaging control program and the spectroscopic measurement program stored in the storage unit 20, thereby functioning as a spectroscopic image acquisition unit 31, a provisional characteristic calculation unit 32, a color conversion unit 33, a reference setting unit 34, a near-infrared characteristic calculation unit 35, a target analysis unit 36, and the like as shown in FIG. 1.

The spectroscopic image acquisition unit 31 controls the spectroscopic camera 10, and acquires, for the target object, spectroscopic images at a plurality of wavelengths in the visible light region (visible spectroscopic images) and spectroscopic images at a plurality of wavelengths in the near-infrared region (near-infrared spectroscopic images).

The provisional characteristic calculation unit 32 uses the first reference stored in the storage unit 20, and calculates, as provisional characteristics, a spectral reflectance characteristic in the visible light region for the pixels based on luminance values of the pixels of the visible spectroscopic images at the plurality of wavelengths. As the first reference used, corresponding to a measurement environment is used. For example, when a spectroscopic image is captured by outdoor imaging, a spectroscopic spectrum of sunlight serving as a light source body is used as the first reference.

The color conversion unit 33 converts provisional characteristic values (spectral reflectance characteristics) of the pixels calculated by the provisional characteristic calculation unit 32 into color coordinate values. Here, the color coordinate values used are color coordinate values including parameters indicating at least saturation. For example, in the embodiment, an L* value indicating brightness and an a* value and a b* value indicating saturation specified by a CIE1976 color space (CIE L*a*b* color system) are calculated. In the embodiment, an example in which L*a*b* is calculated as the color coordinate values is shown, but the present disclosure is not limited thereto. For example, a Hunter Lab color system, an L*C*h* color system, an NCS color system, a PCCS color system, an HLS color system, or an HSV color system, and a color system or a color space for calculating parameters corresponding to the saturation may be used.

The reference setting unit 34 identifies pixels to be set as a second reference based on the color coordinate values including the saturation (L*a*b* value in the embodiment), and sets the second reference.

Specifically, clustering processing is performed on the color coordinate values of the pixels, the pixels are classified into a plurality of classes, and a representative value of color coordinate values of a class whose saturation is the smallest is set as the second reference. A method for the clustering processing is not particularly limited, and for example, a method such as a k-means method can be used. In the k-means method, the number of classes is set and divided to k in advance, pixels serving as k seed points are randomly selected from a plurality of pixels, and a pixel nearest to a seed point is classified into a class of the seed point. A center of gravity of a color coordinate value of each class is re-calculated, and the seed point is moved to the center of gravity position. Thereafter, the above step is repeated while changing a value of k, thereby calculating the number of divisions k of the class and an optimal class to which each pixel belongs. Alternatively, a classification automatically determined by other clustering methods may be corrected, integrated, or divided according to past data, knowledge, and the like.

In a case of the k-means method, a value of a seed point of a class whose saturation is the smallest can be used as the representative value. Alternatively, an average value of color coordinate values belonging to the class whose saturation is the smallest may be used, or a color coordinate value whose saturation is the smallest in the class may be used as the representative value.

The near-infrared characteristic calculation unit 35 uses the set second reference, and calculates reflectances (spectral reflectance characteristics) at wavelengths in the near-infrared region based on luminance values of pixels of the near-infrared spectroscopic images.

The target analysis unit 36 performs various analyses on the target object based on the calculated spectral reflectance characteristics in the near-infrared region. The analysis processing is not particularly limited, and includes, for example, a component analysis of the target object, an analysis of a content amount of a specific component, and type identification of the target object based on the analyzed component.

Principle of Spectroscopic Measurement According to Embodiment

Next, in the embodiment, a principle of a method for performing the spectroscopic measurement on the target object with high accuracy without using a reference object such as a white reference plate and a sensor such as an illuminometer will be described.

Figure 3:
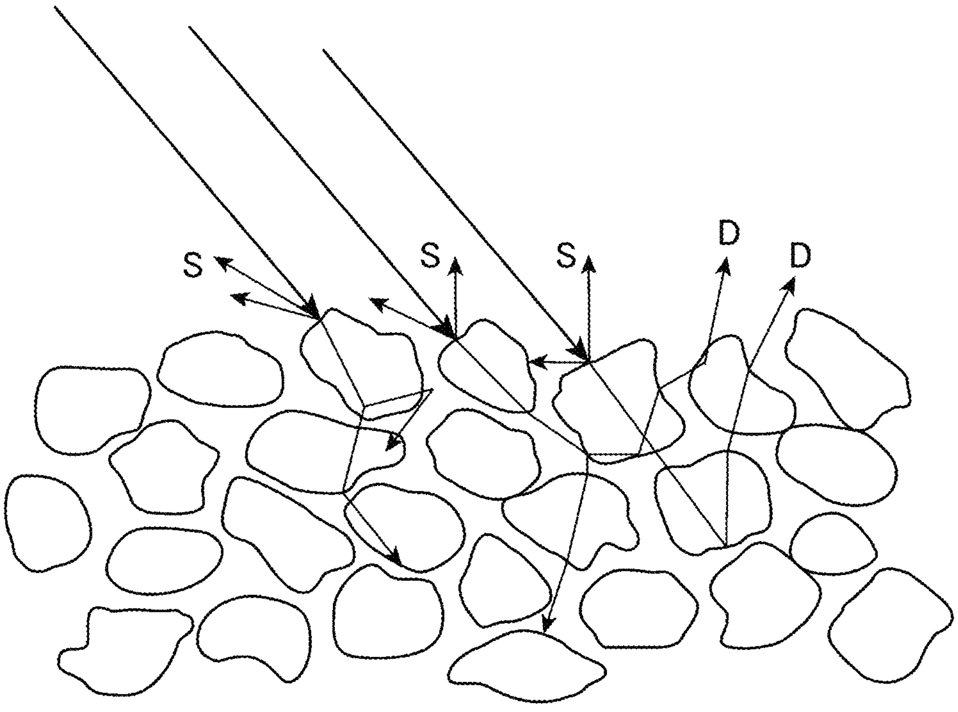
FIG. 3 is a schematic diagram showing reflection components of light incident on an object.

FIG. 3 is a schematic diagram showing reflection components of light incident on an object.

Generally, when light incident on an object surface is reflected, the reflected light can be considered as light obtained by overlapping a specular reflection component S with a diffused reflection component D as shown in FIG. 3.

Radiance L(λ) of the light reflected by the object surface is expressed by the following Equation (1).

$$L(\lambda) = Ie(\lambda)\cdot Kd(\lambda)\cos\theta + Ie(\lambda)\cdot Ks(\lambda)(\cos\alpha)^n \quad (1)$$

Here, Ie(λ) is a spectral radiant intensity of the light source body, and is stored in the storage unit 20 as the first reference in advance in the embodiment. Kd(λ) is a spectral reflectance of the diffused reflection component D. θ is an angle formed by a light source and a normal line of the object surface, that is, an incident angle. Ks(λ) is a spectral reflectance of the specular reflection component S. α is an angle formed by a specular reflection direction when the incident light from the light source is specularly reflected at a reflection position of the object surface and a line-of-sight direction from the reflection position toward the imaging element 121.

In the visible light region, the spectral reflectance Ks(λ) of the specular reflection component S is substantially constant. When the spectral reflectance Ks(λ) is "1" at each wavelength λ, Equation (1) can be expressed as the following Equation (2).

$$L(\lambda) = Ie(\lambda)\cdot Kd(\lambda)\cos\theta + Ie(\lambda)(\cos\alpha)^n \quad (1)$$

That is, in a pixel where the specular reflection component S is dominant and the diffused reflection component D is extremely small, Equation (2) becomes the following Equation (3).

$$L(\lambda) = Ie(\lambda)(\cos\alpha)^n \quad (3)$$

This means that spectral reflection identification in the pixel where the specular reflection component S is dominant substantially matches a light emission spectrum shape of the light source body.

Therefore, the known spectral data of the light source body is stored in the storage unit 20 in advance, and spectral reflectance characteristics of the pixels in the visible light region are calculated as provisional characteristic values based on the spectral data. Then, the spectral reflectance characteristics where the specular reflection component S is dominant are substantially constant values depending on the wavelength. In this case, when the provisional characteristic values are converted into the color coordinate values, the saturation becomes an extremely small value, that is, an achromatic color in the region where the specular reflection component S is dominant.

Therefore, in the embodiment, by identifying a pixel having an achromatic color based on the visible light image, the pixel is identified as a pixel whose spectral reflectance characteristics match the light emission spectrum shape of the light source body, that is, a specular reflection component pixel that constitutes a specular reflection region. The specular reflection region can be regarded as a region where the light emission spectrum shape of the light source body is reflected as it is, a spectroscopic spectrum in the near-infrared region in the specular reflection region can be used as the second reference, and spectral reflectance characteristics in the near-infrared region for other pixels can be accurately calculated.

Spectroscopic Measurement Method

Figure 4:
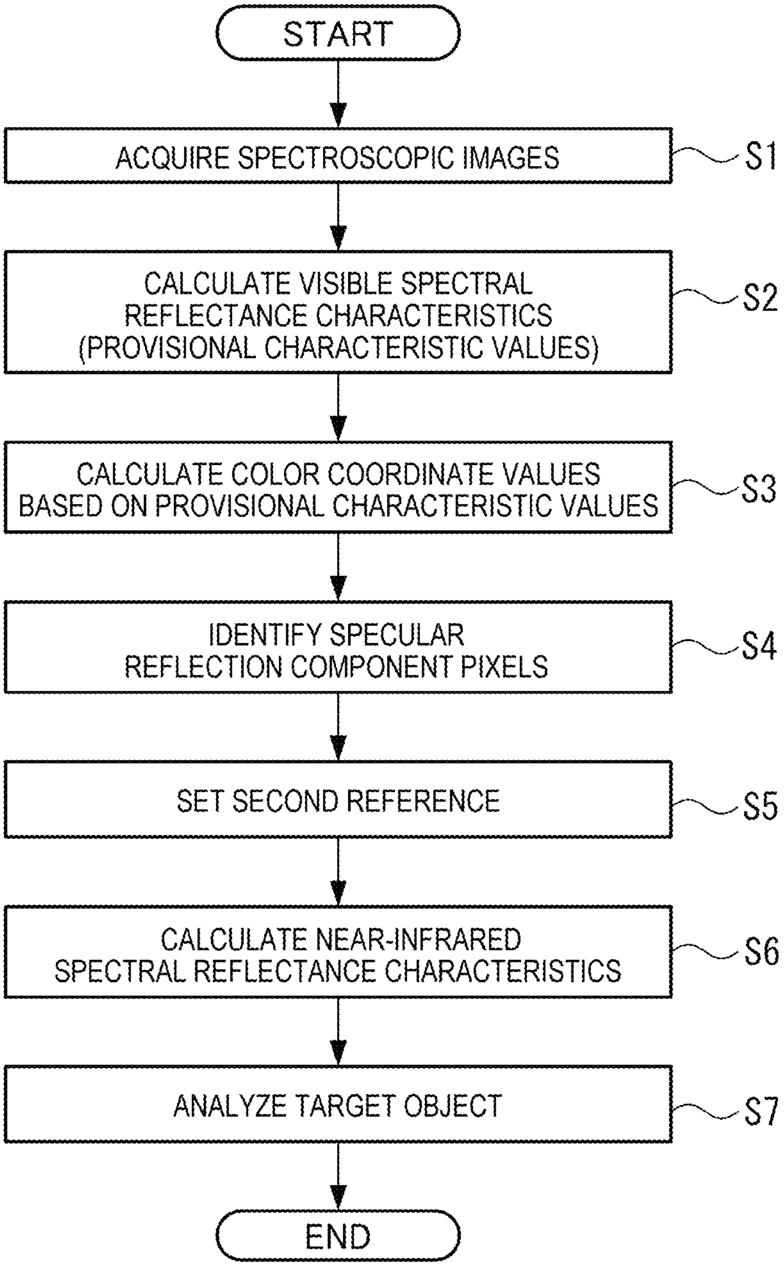
FIG. 4 is a flowchart showing a spectroscopic measurement method according to the embodiment.

Next, a specific spectroscopic measurement method will be described. FIG. 4 is a flowchart showing the spectroscopic measurement method according to the embodiment.

When an operation of performing the spectroscopic measurement is input by a user in the spectrometer 1, the spectrometer 1 first performs spectroscopic image acquisition processing of acquiring captured images of the target object (step S1: spectroscopic image acquisition step).

In the embodiment, the spectroscopic image acquisition unit 31 controls the spectroscopic camera 10 to capture, for a target object, visible spectroscopic images at a plurality of wavelengths and near-infrared spectroscopic images at a plurality of wavelengths. For example, a wavelength of light transmitted through the spectroscopic filter 112 is changed at a preset wavelength interval Δλ, and spectroscopic images from the visible light region to the near-infrared region are captured.

The visible spectroscopic images and the near-infrared spectroscopic images may be acquired at different timings. For example, the visible spectroscopic images may be acquired in step S1. Thereafter, the near-infrared spectroscopic images may be acquired before a near-infrared characteristic calculation step in step S6 to be described later. However, when a deviation in an imaging position of the target object, or a change in a light amount of illumination due to weather or the like occurs, it is difficult to calculate appropriate near-infrared spectral reflectance characteristics. Alternatively, since position correction of correcting the deviation in the imaging position of the near-infrared spectroscopic images and the visible spectroscopic images, light amount correction of illumination light, and the like are separately necessary, both the visible spectroscopic images and the near-infrared spectroscopic images may be acquired in the stage of step S1.

Next, the provisional characteristic calculation unit 32 uses the first reference (the known spectral data of the light source body) stored in the storage unit 20, and calculates spectral reflectance characteristics (provisional characteristic values) based on luminance values of pixels of the visible spectroscopic images obtained in step S1 (step S2: provisional characteristic calculation step).

In step S2, a plurality of pieces of spectral data of a plurality of light source bodies may be stored in advance in the storage unit 20, and the user may be able to select spectral data to be used. For example, the user may be able to select a light source body from sunlight, an incandescent light bulb, an LED light bulb, and the like.

The provisional characteristic calculation unit 32 divides luminance values of pixels of a visible spectroscopic image at a spectral wavelength Ai by spectral data of the light source body at the wavelength Ai stored in the storage unit 20 to calculate the spectral reflectance characteristics, and sets the calculated spectral reflectance characteristics as the provisional characteristic values.

Figure 5:
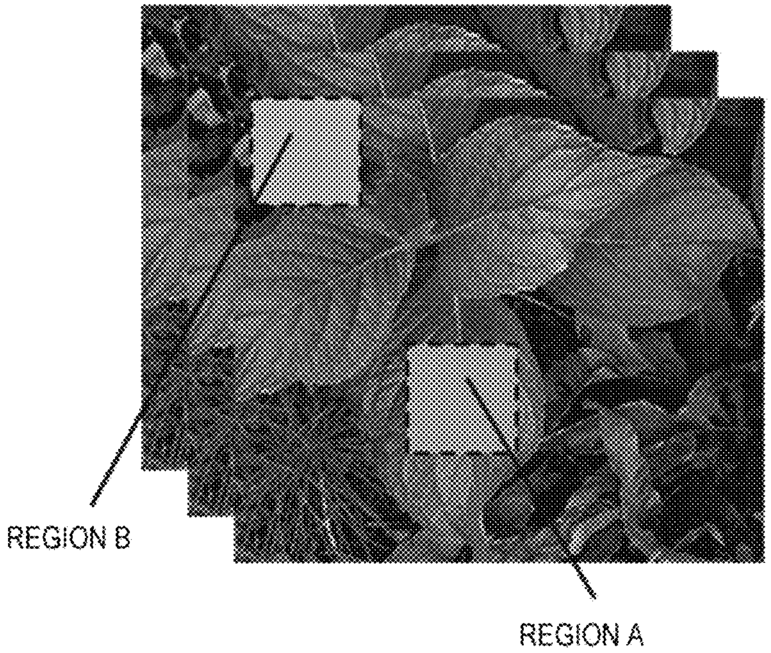
FIG. 5 is a diagram showing an example of a captured visible spectroscopic image in the embodiment.
Figure 6:
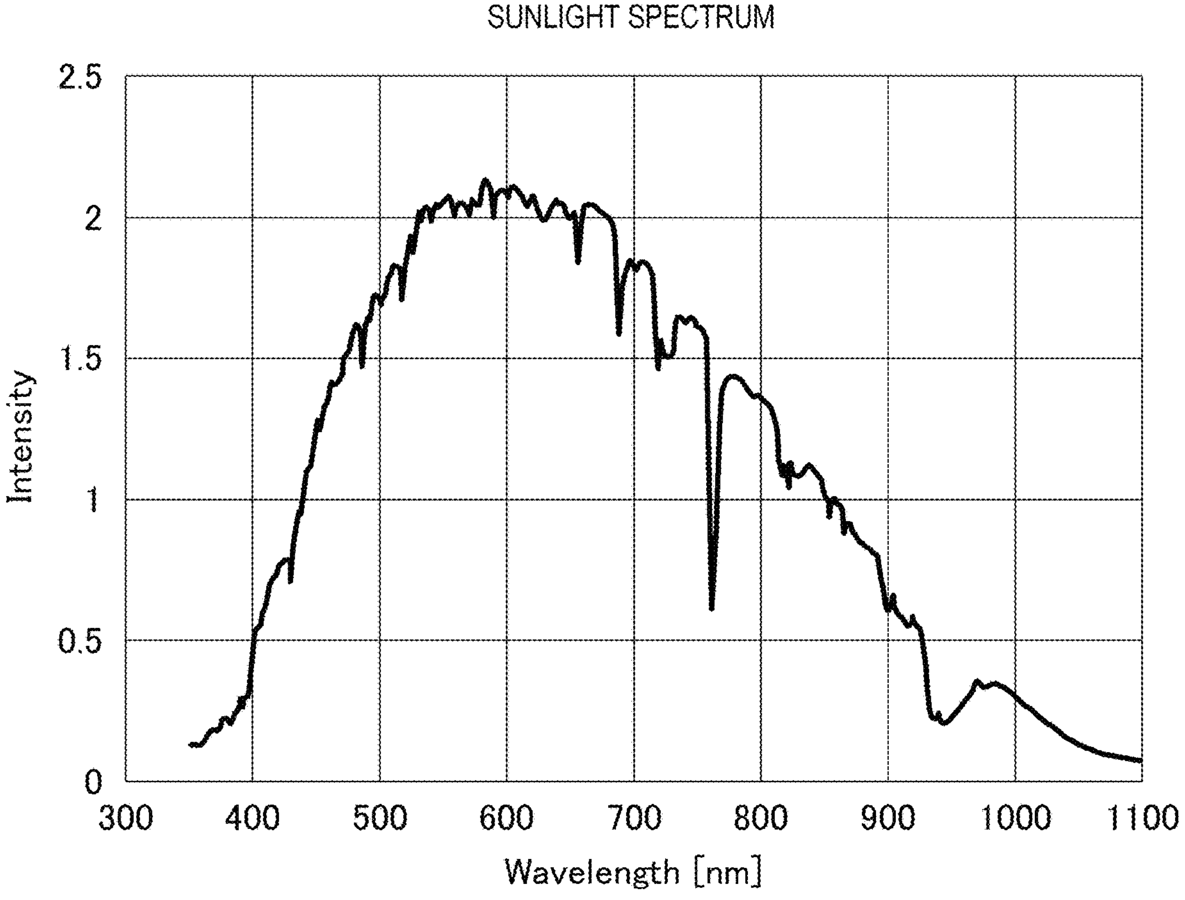
FIG. 6 is a diagram showing spectral data of sunlight that is an example of known spectral data of a light source body.
Figure 7:
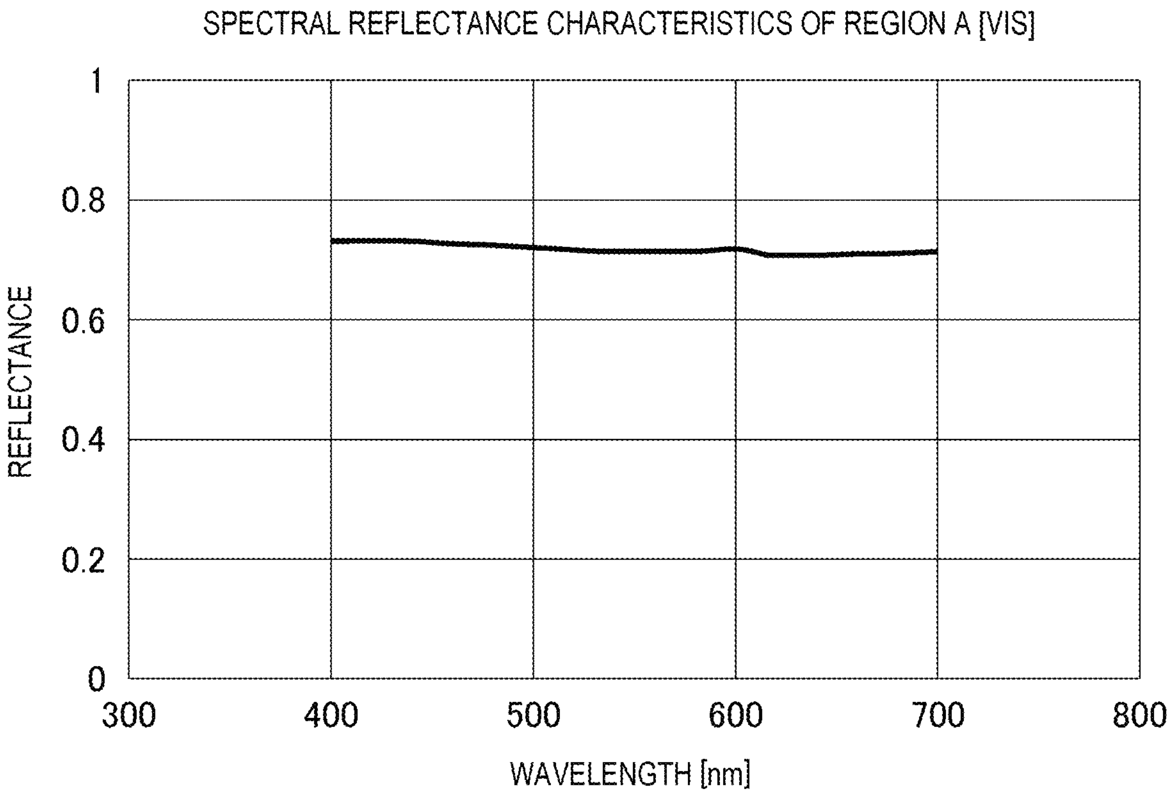
FIG. 7 is a diagram showing spectral reflectance characteristics in a region A in FIG. 5.
Figure 8:
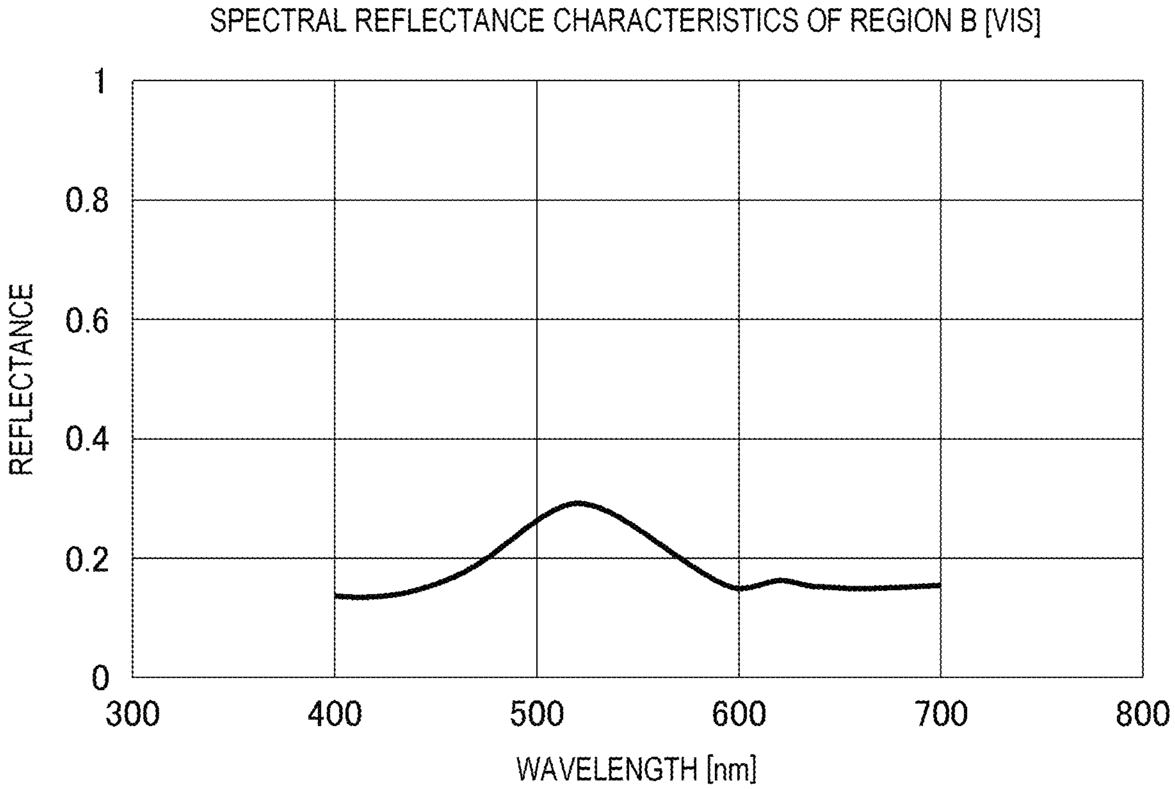
FIG. 8 is a diagram showing spectral reflectance characteristics in a region B in FIG. 5.

Here, FIG. 5 is a diagram showing an example of a captured visible spectroscopic image. FIG. 6 is a diagram showing spectral data of the sunlight as an example of the known spectral data of the light source body. FIG. 7 is a diagram showing spectral reflectance characteristics in a region A in FIG. 5. FIG. 8 is a diagram showing spectral reflectance characteristics in a region B in FIG. 5.

The examples in FIGS. 5 to 8 are examples when a target object is imaged outdoors with the sunlight serving as the light source body. In the region A, the sunlight is specularly reflected and is incident on the spectroscopic camera 10. That is, in the region A, the specular reflection component S is dominant, and an amount of reflected light of the diffused reflection component D is extremely small. Therefore, when the spectral reflectance characteristics (provisional characteristic values) are calculated with the spectral data of the sunlight as shown in FIG. 6 serving as the first reference, spectral reflectances at wavelengths in the region A are substantially constant as shown in FIG. 7. On the other hand, in the region B, the specular reflection component S is present but not dominant, and a large amount of the diffused reflection component D is included. Therefore, as shown in FIG. 8, a different spectral reflectance is calculated for each wavelength.

Next, the color conversion unit 33 converts the calculated provisional characteristic values into color coordinate values (step S3: color conversion step). For example, the color conversion unit 33 converts the spectral reflectance characteristics (provisional characteristic values) into tristimulus values XYZ, and further converts the XYZ values into L*a*b* value in a CIE L*a*b* color system.

Figure 9:
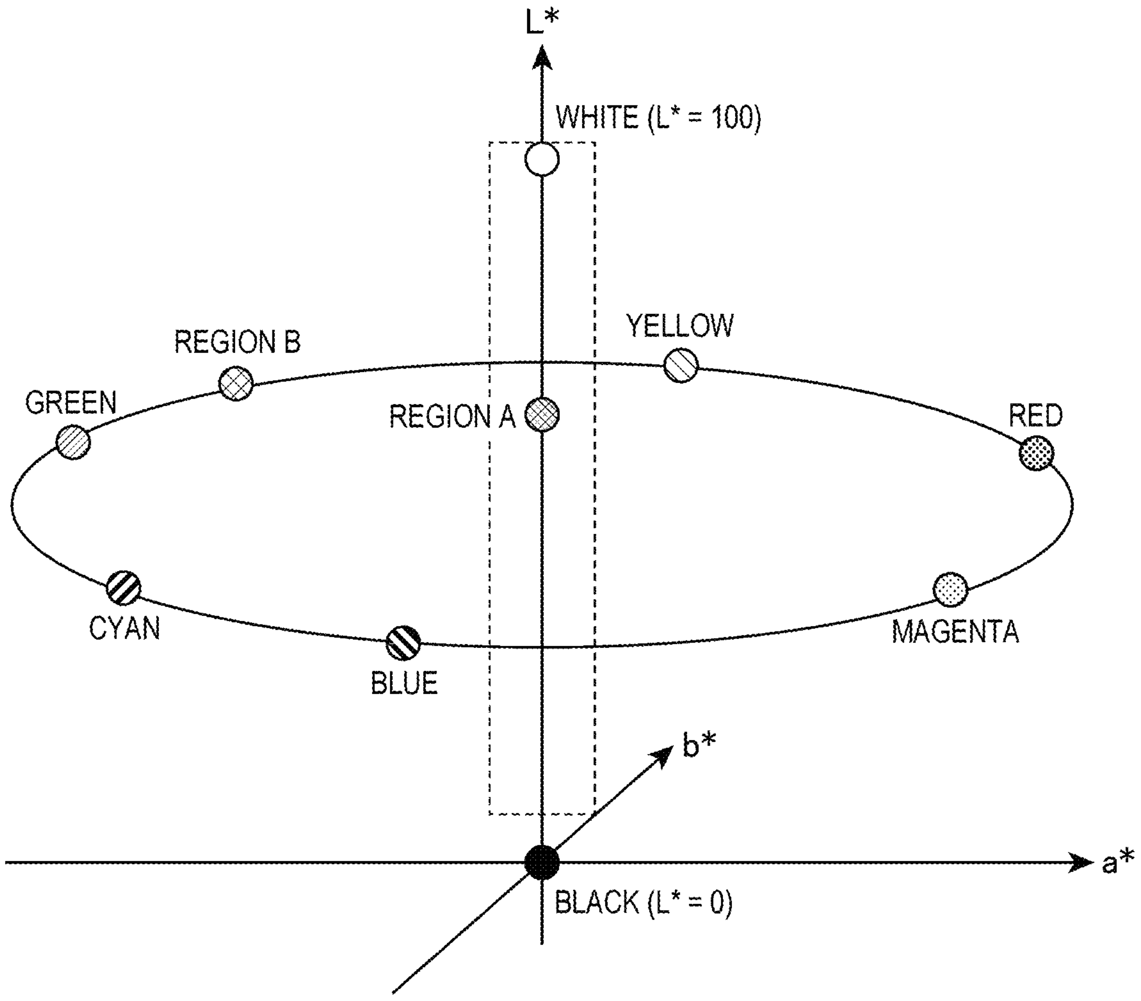
FIG. 9 is a diagram showing a color coordinate space in a CIE L*a*b* color system.

FIG. 9 is a diagram showing a color coordinate space in the CIE L*a*b* color system.

In the region A, since the spectral reflectances at wavelengths are uniform, an achromatic color (the a* value and the b* value are small) is indicated in the color coordinate values. Therefore, in the color coordinate space as shown in FIG. 9, pixels included in the region A are plotted near an L* axis surrounded by a broken line. On the other hand, the region B has chromatic colors, and is plotted at a position away from the L* axis as shown in FIG. 9.

Next, the reference setting unit 34 identifies pixels corresponding to the achromatic color (specular reflection component pixels) based on the color coordinate values of the pixels obtained by conversion in step S3 (step S4). In the embodiment, the reference setting unit 34 performs clustering processing on the color coordinate values of the pixels by using the k-means method or the like, and identifies a class corresponding to the achromatic color.

Figure 10:
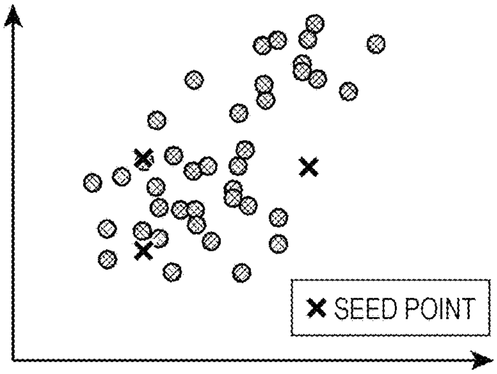
FIG. 10 is a diagram showing an example of clustering processing by a k-means method according to the embodiment.
Figure 10:
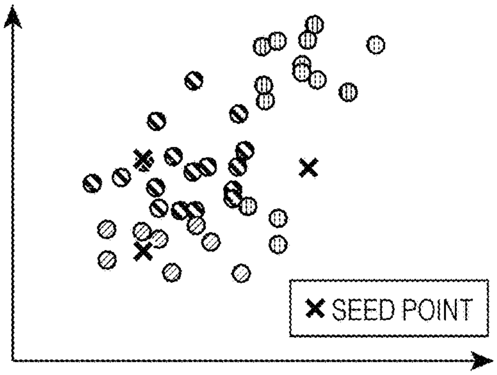
Figure 10:
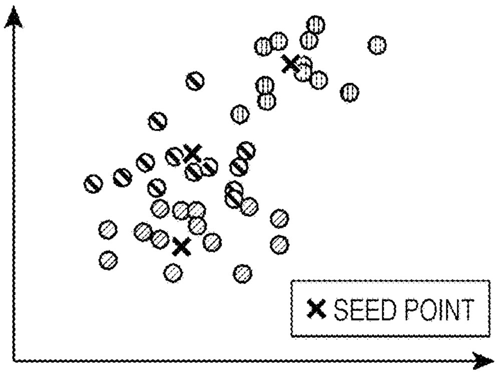

FIG. 10 is a diagram showing an example of the clustering processing by the k-means method according to the embodiment. Generally, it is difficult to identify the dominant pixels of the specular reflection component S only based the color coordinate values. Therefore, in the k-means method, seed points of the number of divisions k of a class are randomly selected. For example, two (k=2) classes indicating which of the specular reflection component S and the diffused reflection component D is dominant may be set as an initial state, or three or more seed points whose color differences in another color coordinate space are large may be selected and set as the initial state. Then, a class to which each pixel belongs is set according to a distance between a color coordinate value of each pixel and each seed point. Further, a center-of-gravity point of each class is reset as a seed point of a new class, and each color coordinate value is clustered and classified again. In this way, by repeatedly dividing the color coordinate values of the pixels into classes, optimal divided classes are found.

Here, the k-means method in which the number of divisions k is designated in advance is exemplified, but other clustering methods may be used. For example, an x-means method in which the number of clusters is automatically set may be used.

Then, the reference setting unit 34 selects a class whose saturation is the smallest among the set classes, and sets a representative value of the class as the second reference (step S5). Steps S4 and S5 correspond to a reference setting step in the present disclosure.

The class whose saturation is the smallest may be identified based on, for example, the a* values and the b* values (distances from the L* axis) of seed points of each class. When two classes (k=2) including a specular reflection component class and a diffused reflection component class are set, the specular reflection component class may be identified.

The reference setting unit 34 sets the second reference based on near-infrared region spectroscopic spectrums of pixels (specular reflection component pixels) belonging to the identified class. For example, an average value of near-infrared region spectroscopic spectrums of pixels belonging to a class whose saturation is the smallest may be set as the second reference, or a near-infrared region spectroscopic spectrum of a pixel corresponding to a seed point may be set as the second reference. Further, an average value of near-infrared region spectroscopic spectrums of pixels within a predetermined color difference from a seed point may be set as the second reference.

In the examples in FIGS. 5 to 8, the region A is identified as region where the specular reflection component S is dominant. In the region A, spectroscopic spectrums having a shape substantially matching the light emission spectrum shape of the light source body are obtained, and the second reference is set based on the obtained spectroscopic spectrums. That is, luminance spectrums of the pixels in the region A (luminance values at wavelengths) have characteristics of having a shape the same as the light emission spectrum shape of the light source body, and reflectance characteristics in the near-infrared region also substantially match the light emission spectrum shape of the light source body. When the second reference is set based on the luminance values in such a region A, i.e., a specular reflection region, the second reference corresponding to the light emission spectrum of the light source body can be set without using a reference object such as a white reference plate, an illuminance sensor, and the like.

Thereafter, the near-infrared characteristic calculation unit 35 uses the near-infrared spectroscopic image among the captured images acquired in step S1 and the second reference set in step S5, and calculates near-infrared spectral reflectance characteristics of the pixels (step S6: near-infrared characteristic calculation step). That is, a luminance value of each pixel of the near-infrared spectroscopic image at each wavelength is using divided the second reference at a corresponding wavelength to calculate a reflectance.

At this time, since the reflectance of the pixels used for setting the second reference is 1, the pixels may be excluded from step S6.

The target analysis unit 36 performs various analyses on the target object based on the near-infrared region spectral reflectance characteristics calculated in step S6 (step S7).

Figure 11:
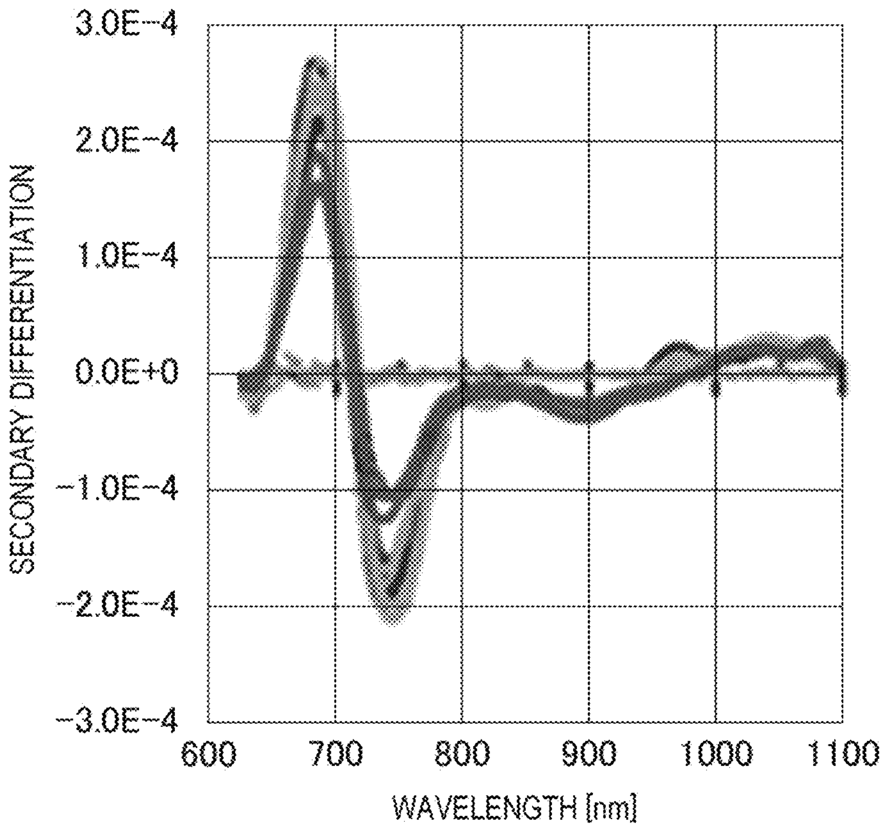
FIG. 11 is a diagram showing secondary differential values of spectral reflectances of a plurality of pixels.
Figure 12:
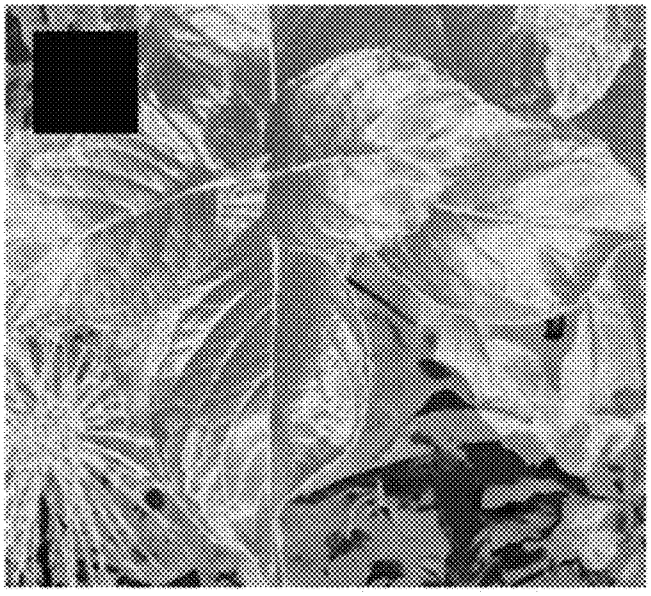
FIG. 12 is a diagram showing an example in which a spectroscopic analysis result is displayed as an image.

FIGS. 11 and 12 are diagrams showing an example of analysis processing performed by the target analysis unit 36.

Here, FIG. 11 is a diagram showing secondary differential values of spectral reflectances of a plurality of pixels. FIG. 12 is a diagram showing an example in which a spectroscopic analysis result is displayed as an image.

The target analysis unit 36 performs various analysis processing based on the spectral reflectance characteristics in the near-infrared region obtained in step S6. The analysis processing is not particularly limited as described above, and various types of processing based on the spectral reflectance in the near-infrared region can be performed as the analysis processing. For example, as shown in FIG. 11, a specific light absorption wavelength may be identified by calculating the secondary differential values (or first differential values) of the spectral reflectance characteristics of the pixels, and a predetermined component contained in the target object may be analyzed based on the light absorption wavelength. Further, as shown in FIG. 12, by displaying a secondary differential value on a captured image in an overlapping manner, a position of the predetermined component distributed in the captured image may be analyzed.

Functions and Effects of Embodiment

When measuring the spectral reflectance characteristics in the near-infrared region for the target object, the spectrometer 1 according to the embodiment performs the spectroscopic image acquisition step (step S1), the provisional characteristic calculation step (step S2), the color conversion step (step S3), the reference setting step (steps S4 and S5), and the near-infrared characteristic calculation step (step S6). In the spectroscopic image acquisition step, the visible spectroscopic images at the plurality of wavelengths in the visible light region and the near-infrared spectroscopic images at the plurality of wavelengths in the near-infrared region are acquired for the target object.

In the provisional characteristic calculation step, the spectroscopic spectrum of the light source body whose spectroscopic spectrum is known is used as the first reference, and the spectral reflectance characteristic in the visible light region for each pixel of each of the visible spectroscopic images is calculated and set as the provisional characteristic value.

In the color conversion step, the provisional characteristic value is converted into the color coordinate value including the saturation.

In the reference setting step, the specular reflection component pixel is identified based on the saturation for each pixel, and the second reference is set based on the specular reflection component pixel.

In the near-infrared characteristic calculation step, the spectral reflectance characteristic in the near-infrared region for each pixel of each of the near-infrared spectroscopic images is calculated using the second reference.

As described above, in the embodiment, the specular reflection component pixel (specular reflection region) of the visible spectroscopic image is identified. The specular reflection component pixel is a pixel that specularly reflects the light of the light source body, and is inappropriate for performing the component analysis. However, since the spectral reflectance characteristics having the shape substantially the same as the light emission spectrum shape of the light source body are provided, by setting the spectral data (luminance value) in the near-infrared region for the specular reflection component pixel as the second reference, spectral reflectance characteristics in the near-infrared region for other pixels can be accurately measured.

Accordingly, in the embodiment, the second reference corresponding to the light source body in the near-infrared region can be appropriately set without using a reference object whose reflectance is known such as a white reference plate and an illuminance sensor. Therefore, the configuration of the spectrometer can be simplified. For example, even if the spectrometer is mounted on a small flying object such as a drone or a portable terminal device such as a smartphone, since the reference object, the illuminance sensor, and the like do not need to be mounted, weight reduction and space saving of the device can be achieved.

In the embodiment, the color conversion unit 33 converts the provisional characteristic value into the color coordinate value in the CIE L*a*b* color system in the color conversion step (step S3).

The a* value and the b* value in the CIE L*a*b* color system are parameters indicating hue and saturation, and a pixel where the specular reflection component S is dominant can be easily identified by searching for a pixel having a small a* value and a small b* value (a pixel close to the L* axis).

In the embodiment, the reference setting unit 34 classifies the pixels into the plurality of classes by performing the clustering processing on the color coordinate values of the pixels, and identifies the pixels included in the class whose saturation is the smallest as the specular reflection component pixels.

Generally, when a pixel whose saturation is equal to or smaller than a predetermined threshold is identified as the specular reflection region, for example, in a visible light image that is whitish as a whole or a visible light image that is dark as a whole, even a pixel that is not the specular reflection region may be identified as the specular reflection region. On the other hand, when a color is clear as a whole, the specular reflection region cannot be identified. In contrast, in the embodiment, by clustering the color coordinate values of the pixels, the pixels are classified into the plurality of classes, and the class whose saturation is the smallest is identified as the pixels in the specular reflection region. Accordingly, it is possible to identify the specular reflection region even for an image such as the one described above, in which it is impossible to determine whether a color is achromatic based on the color coordinate values alone.

In the embodiment, the reference setting unit 34 sets the representative value of the spectroscopic spectrums of the specular reflection component pixels of the near-infrared spectroscopic images as the second reference in step S5. An appropriate second reference can be set, and spectral reflectance characteristics in the near-infrared region can be measured with high accuracy by setting the representative value of the plurality of specular reflection component pixels in the specular reflection region as the second reference.

Average spectral data of the specular reflection component pixels in the specular reflection region is preferably set as the representative value. Accordingly, as compared with a case where the second reference is set only using one pixel, the second reference can be set with a small error.

A median value or a mode value of the specular reflection component pixels in the specular reflection region may be used as the representative value. When there is a variation in the spectral data of the specular reflection component pixels in the specular reflection region, a more appropriate second reference can be set by using the median value or the mode value.

The reference setting unit 34 may select to use one of the average value, the median value, and the mode value in response to the variation in the spectral data of the specular reflection component pixels in the specular reflection region.

Modifications

The present disclosure is not limited to the embodiments described above and modifications. The present disclosure includes modifications, improvements, and configurations obtained by appropriately combining the embodiments within a scope where an object of the present disclosure can be achieved.

Modification 1

For example, in the first embodiment described above, the reference setting unit 34 performs the clustering processing on the color coordinate values of the pixels, classifies the color coordinate values of the pixels into the plurality of classes, and sets the second reference based on the representative value of the class whose saturation is the smallest in the reference setting step of steps S4 and S5.

In contrast, the reference setting unit 34 may identify a pixel whose saturation (the a* value and the b* value) is equal to or smaller than a predetermined threshold in the color coordinate values of the pixels as the specular reflection component pixel. That is, a pixel whose distance from the L* axis in the color coordinate values is equal to or smaller than a preset threshold may be identified as the specular reflection component pixel.

In this case, the second reference is set based on a representative value of a plurality of identified specular reflection component pixels.

The reference setting unit 34 may change the threshold based on average saturation of the entire visible light image. For example, in a visible image that is whitish or dark as a whole, average saturation (distances from the L* axis of the color coordinate values of the pixels) of the entire image is low, but in this case, the threshold may be set to be small. When the average saturation of the entire image is high, the threshold may be set to be large.

In setting the threshold for the average saturation of the entire visible light image, for example, samples of a plurality of visible spectroscopic images whose specular reflection component pixels are known may be used, values of saturation of the specular reflection component pixels with respect to the average saturation may be measured, and a measurement result may be stored as table data in the storage unit 20. Alternatively, a machine learning model that outputs a threshold for identifying the specular reflection component pixels may be generated for the input visible spectroscopic images by performing machine learning on samples of a plurality of visible spectroscopic images whose specular reflection component pixels are known.

Alternatively, a machine learning model that identifies the specular reflection component pixels and outputs a value of the second reference may be generated for the input visible spectroscopic images by performing machine learning on samples of a plurality of visible spectroscopic images whose specular reflection component pixels are known.

The above is an example in which the pixels whose saturation is equal to or smaller than the threshold are identified as the specular reflection component pixels, but the reference setting unit 34 may set the second reference based on a pixel whose saturation is the smallest. Further, when there are pixels whose saturation is equal to or smaller than a threshold in the visible spectroscopic images, the pixels may be used as the specular reflection component pixels, and the second reference may be set. When there is no pixel equal to or smaller than the threshold, a pixel whose saturation is the smallest may be identified as the specular reflection component pixel. Alternatively, as in the embodiment described above, the clustering processing may be performed on the color coordinate values to divide the color coordinate values into the plurality of classes, and the class whose saturation is the smallest may be identified.

Modification 2

The embodiment described above is an example in which the flying object such as a drone or the portable terminal device such as a smartphone functions as the spectrometer, but the present disclosure is not limited thereto.

For example, only the spectroscopic camera 10 may be mounted on a small and lightweight device, for example, the flying object such as a drone, or the portable terminal device, and the spectrometer according to the present disclosure may be implemented by a computer communicably connected to the small and lightweight device. Examples of the computer include a terminal device (a notebook computer, a smartphone, a tablet terminal, and the like) that can communicate with the flying object such as a drone via the Internet, and a server device that communicates with the portable terminal device such as a smartphone via the Internet.

In this case, the processor 30 (spectroscopic image acquisition unit 31) of the computer may acquire a spectroscopic image captured by the spectroscopic camera 10 of the small and lightweight device from the small and lightweight device by wireless communication.

In such a case, similar to the embodiment described above, highly accurate spectroscopic measurement can also be performed without mounting a reference object such as a white reference plate, an illuminance sensor, and the like on the small and lightweight device.

CONCLUSION OF PRESENT DISCLOSURE

A spectroscopic measurement method according to a first aspect of the present disclosure includes: a spectroscopic image acquisition step of acquiring, for a target object, visible spectroscopic images at a plurality of wavelengths in a visible light region and near-infrared spectroscopic images at a plurality of wavelengths in a near-infrared region; a provisional characteristic calculation step of setting a spectroscopic spectrum of a light source body whose spectroscopic spectrum is known as a first reference, and calculating a spectral reflectance characteristic in a visible light region for each pixel as a provisional characteristic value by using the visible spectroscopic images at the plurality of wavelengths in the visible light region and the first reference; a color conversion step of converting the provisional characteristic value into a color coordinate value including saturation; a reference setting step of identifying, based on the saturation for each pixel, a specular reflection component pixel that is a pixel where a light component specularly reflected by the target object is dominant, and setting a second reference based on the specular reflection component pixel; and a near-infrared characteristic calculation step of calculating a spectral reflectance characteristic in a near-infrared region for each pixel by using the near-infrared spectroscopic images at the plurality of wavelengths in the near-infrared region and the second reference.

Accordingly, a reference object such as a white reference plate for measuring a light emission spectrum of light emitted from the light source body, and an illuminance sensor for measuring light spectral data of the light source body are not necessary. Therefore, for example, even if the spectrometer is mounted on a flying object such as a drone or a portable terminal device such as a smartphone, the reference object, the illuminance sensor, and the like do not need to be mounted, and weight reduction and space saving of the device can be achieved.

The specular reflection component pixel in the visible spectroscopic image is identified, and the spectral data in the near-infrared region for the specular reflection component pixel is set as the reference, whereby the spectral reflectance characteristic in the near-infrared region can be accurately measured even if the illuminance sensor and the reference object are not used.

In the spectroscopic measurement method according to the present aspect, in the color conversion step, the provisional characteristic value may be converted into a color coordinate value in a CIE L*a*b* color system.

Accordingly, a pixel where the specular reflection component is dominant can be easily identified based on an a* value and a b* value that are parameters indicating the saturation and hue.

In the spectroscopic measurement method according to the present aspect, in the reference setting step, a plurality of the pixels may be classified into a plurality of classes by performing clustering processing on the color coordinate value for each pixel, and the pixel in the class whose saturation is smallest may be identified as the specular reflection component pixel.

Accordingly, the specular reflection component can be appropriately identified for various visible spectroscopic images. That is, in a visible light image that is whitish as a whole, a visible light image that is dark as a whole, or the like, it is difficult to classify saturation into a pixel having a chromatic color and a pixel having an achromatic color based on a threshold. In contrast, by using a clustering technique, the specular reflection component pixel can be appropriately identified even if it is difficult to identify an achromatic color portion only based on the color coordinate value.

In the spectroscopic measurement method according to the present aspect, in the reference setting step, the pixel whose saturation of the color coordinate value is equal to or smaller than a predetermined threshold may be identified as the specular reflection component pixel.

For example, in a clearly visible image with clear differences in saturation, by identifying the pixel whose saturation is equal to or smaller than the predetermined threshold as the specular reflection component pixel, an appropriate specular reflection component pixel can be more easily and swiftly identified.

In the spectroscopic measurement method according to the present aspect, in the reference setting step, a representative value of a spectroscopic spectrum based on a luminance value of the specular reflection component pixel in the near-infrared spectroscopic image may be set as the second reference.

In the present aspect, in the near-infrared spectroscopic images at wavelengths, based on a luminance value of the same specular reflection component pixel, a spectroscopic spectrum in the near-infrared region for the specular reflection component pixel can be calculated. In the present aspect, a representative value of spectroscopic spectrums of a plurality of specular reflection component pixels is set as the second reference. Accordingly, for example, as compared with a case where the second reference is set based on a single pixel, a more appropriate second reference can be set, and a spectral reflectance characteristic in the near-infrared region can be measured with high accuracy.

A spectrometer according to a second aspect of the present disclosure includes: a spectroscopic image acquisition unit configured to acquire, for a target object, visible spectroscopic images at a plurality of wavelengths in a visible light region and near-infrared spectroscopic images at a plurality of wavelengths in a near-infrared region; a provisional characteristic calculation unit configured to set a spectroscopic spectrum of a light source body whose spectroscopic spectrum is known as a first reference, and calculate a spectral reflectance characteristic in a visible light region for each pixel as a provisional characteristic value by using the visible spectroscopic images at the plurality of wavelengths in the visible light region and the first reference; a color conversion unit configured to convert the provisional characteristic value into a color coordinate value including saturation; a reference setting unit configured to identify, based on the saturation for each pixel, a specular reflection component pixel that is a pixel where a light component specularly reflected by the target object is dominant, and set a second reference based on the specular reflection component pixel; and a near-infrared characteristic calculation unit configured to calculate a spectral reflectance characteristic in a near-infrared region for each pixel by using the near-infrared spectroscopic images at the plurality of wavelengths in the near-infrared region and the second reference.

In such a spectrometer, the spectroscopic measurement method according to the first aspect can be performed. Accordingly, a reference object whose reflectance is known such as a white reference plate for measuring a light emission spectrum of light emitted from the light source body, and an illuminance sensor for measuring light spectral data of the light source body are not necessary. Therefore, weight reduction and space saving of the device can be achieved.

The specular reflection component pixel in the visible spectroscopic image is identified, and the spectral data in the near-infrared region for the specular reflection component pixel is set as the reference, whereby the spectral reflectance characteristic in the near-infrared region can be accurately measured even if the illuminance sensor and the reference object are not used.

A spectroscopic measurement program according to a third aspect of the present disclosure that can be read and executed by a computer, in which by being read and executed by the computer, the spectroscopic measurement program causes the computer to perform: a spectroscopic image acquisition step of acquiring, for a target object, visible spectroscopic images at a plurality of wavelengths in a visible light region and near-infrared spectroscopic images at a plurality of wavelengths in a near-infrared region; a provisional characteristic calculation step of setting a spectroscopic spectrum of a light source body whose spectroscopic spectrum is known as a first reference, and calculating a spectral reflectance characteristic in a visible light region for each pixel as a provisional characteristic value by using the visible spectroscopic images at the plurality of wavelengths in the visible light region and the first reference;

a color conversion step of converting the provisional characteristic value into a color coordinate value including saturation; a reference setting step of identifying, based on the saturation for each pixel, a specular reflection component pixel that is a pixel where a light component specularly reflected by the target object is dominant, and setting a second reference based on the specular reflection component pixel; and a near-infrared characteristic calculation step of calculating a spectral reflectance characteristic in a near-infrared region for each pixel by using the near-infrared spectroscopic images at the plurality of wavelengths in the near-infrared region and the second reference.

Such a spectroscopic measurement program is read and executed by the computer, whereby the spectroscopic measurement method according to the first aspect can be performed. Accordingly, a reference object whose reflectance is known such as a white reference plate for measuring a light emission spectrum of light emitted from the light source body, and an illuminance sensor for measuring light spectral data of the light source body are not necessary. Weight reduction and space saving of the device on which the spectroscopic camera is mounted can be achieved.

The specular reflection component pixel in the visible spectroscopic image is identified, and the spectral data in the near-infrared region for the specular reflection component pixel is set as the reference, whereby the spectral reflectance characteristic in the near-infrared region can be accurately measured even if the illuminance sensor and the reference object are not used.

What is claimed is:

1. A spectroscopic measurement method comprising:
- a step of storing in a memory
  - an image of a target object, wherein the image of the target object includes a visible light region and a near-infrared region, and
  - a spectroscopic spectrum of a light source body, wherein the spectroscopic spectrum of the light source body is known;
- a spectroscopic image acquisition step of acquiring, for the target object, visible spectroscopic images at a plurality of wavelengths in the visible light region and near-infrared spectroscopic images at a plurality of wavelengths in the near-infrared region;
- a provisional characteristic calculation step of
  - setting the spectroscopic spectrum of the light source body as a first reference,
  - calculating, spectral reflectance characteristics of a plurality of first pixels in the visible light region, by using the visible spectroscopic images at the plurality of wavelengths in the visible light region and the first reference, and
  - setting the calculated spectral reflectance characteristics of the plurality of first pixels as provisional characteristic values;
- a color conversion step of converting the provisional characteristic values of the plurality of first pixels into color coordinate values of the plurality of first pixels including saturation;
- a reference setting step of
  - identifying, based on the color coordinate values of the plurality of first pixels, specular reflection component pixels that constitute the visible light region that is a region where a light component specularly reflected by the target object is dominant, and
  - setting a second reference by using the specular reflection component pixels that constitute the visible light region;
- a near-infrared characteristic calculation step of calculating, spectral reflectance characteristics of a plurality of second pixels in the near-infrared region, by division of:
  - a luminance value of each pixel of the plurality of second pixels of a near-infrared spectroscopic image at each wavelength, and
  - the second reference at a corresponding wavelength, wherein
    - the near-infrared spectroscopic images at the plurality of wavelengths include the near-infrared spectroscopic image at each wavelength; and
- a step of controlling display of, on the image of the target object, a value of a spectral reflectance characteristic in the near-infrared region, wherein
  - the spectral reflectance characteristics in the near-infrared region include the spectral reflectance characteristic in the near-infrared region.

2. The spectroscopic measurement method according to claim 1, wherein in the color conversion step, the provisional characteristic values is converted into the color coordinate values in a CIE L*a*b* color system.

3. The spectroscopic measurement method according to claim 1, wherein in the reference setting step, the plurality of first pixels are classified into a plurality of classes by performing clustering processing on the color coordinate values of the plurality of first pixels, and the plurality of first pixels included in a class of the plurality of classes whose saturation is smallest is identified as the specular reflection component pixels.

4. The spectroscopic measurement method according to claim 1, wherein
- in the reference setting step, a pixel whose saturation is equal to or smaller than a predetermined threshold in the color coordinate values of the plurality of first pixels is identified as a specular reflection component pixel, and
- the specular reflection component pixels include the specular reflection component pixel.

5. The spectroscopic measurement method according to claim 1, wherein in the reference setting step, a representative value of spectroscopic spectrums of the specular reflection component pixels of the near-infrared spectroscopic images is set as the second reference.

6. A spectrometer comprising:
- a memory configured to store
  - an image of a target object, wherein the image of the target object includes a visible light region and a near-infrared region, and
  - a spectroscopic spectrum of a light source body, wherein the spectroscopic spectrum of the light source body is known; and
- a processor configured to:
  - acquire, for the target object, visible spectroscopic images at a plurality of wavelengths in the visible light region and near-infrared spectroscopic images at a plurality of wavelengths in the near-infrared region;
  - set the spectroscopic spectrum of the light source body as a first reference;
  - calculate, spectral reflectance characteristics of a plurality of first pixels in the visible light region, by using the visible spectroscopic images at the plurality of wavelengths in the visible light region and the first reference;
  - set the calculated spectral reflectance characteristics of the plurality of first pixels as provisional characteristic values;
  - convert the provisional characteristic values of the plurality of first pixels into color coordinate values of the plurality of first pixels including saturation;

identify, based on the color coordinate values of the plurality of first pixels, specular reflection component pixels that constitute the visible light region that is a region where a light component specularly reflected by the target object is dominant;

set a second reference by using the specular reflection component pixels that constitute the visible light region;

calculate, spectral reflectance characteristics of a plurality of second pixels in the near-infrared region, by division of:

a luminance value of each pixel of the plurality of second pixels of a near-infrared spectroscopic image at each wavelength, and the second reference at a corresponding wavelength, wherein the near-infrared spectroscopic images at the plurality of wavelengths include the near-infrared spectroscopic image at each wavelength; and control a device to display, on the image of the target object, a value of a spectral reflectance characteristic in the near-infrared region, wherein the spectral reflectance characteristics in the near-infrared region include the spectral reflectance characteristic in the near-infrared region.

7. A non-transitory computer-readable medium having stored thereon, computer-executable instructions which, when executed by a processor, cause the processor to execute operations, the operations comprising:

a step of storing in a memory an image of a target object, wherein the image of the target object includes a visible light region and a near-infrared region, and a spectroscopic spectrum of a light source body, wherein the spectroscopic spectrum of the light source body is known;

a spectroscopic image acquisition step of acquiring, for the target object, visible spectroscopic images at a plurality of wavelengths in the visible light region and near-infrared spectroscopic images at a plurality of wavelengths in the near-infrared region;

a provisional characteristic calculation step of setting the spectroscopic spectrum of the light source body as a first reference, calculating, spectral reflectance characteristics of a plurality of first pixels in the visible light region, by using the visible spectroscopic images at the plurality of wavelengths in the visible light region and the first reference, and setting the calculated spectral reflectance characteristics of the plurality of first pixels as provisional characteristic values;

a color conversion step of converting the provisional characteristic values of the plurality of first pixels into color coordinate values of the plurality of first pixels including saturation;

a reference setting step of identifying, based on the color coordinate values of the plurality of first pixels, specular reflection component pixels that constitute the visible light region that is a region where a light component specularly reflected by the target object is dominant, and setting a second reference by using the specular reflection component pixels that constitute the visible light region;

a near-infrared characteristic calculation step of calculating, spectral reflectance characteristics of a plurality of second pixels in the near-infrared region, by division of:

a luminance value of each pixel of the plurality of second pixels of a near-infrared spectroscopic image at each wavelength, and the second reference at a corresponding wavelength, wherein the near-infrared spectroscopic images at the plurality of wavelengths include the near-infrared spectroscopic image at each wavelength; and a step of controlling display of, on the image of the target object, a value of a spectral reflectance characteristic in the near-infrared region, wherein the spectral reflectance characteristics in the near-infrared region include the spectral reflectance characteristic in the near-infrared region.

* * * * *